: 3,531,479
Patented Sept. 29, 1970

3,531,479
LIGHT STABLE COLORANTS AND ULTRAVIOLET INHIBITORS FOR PLASTICS
Raymond C. Harris and Gordon C. Newland, Kingsport, Tenn., assignors to Eastman Kodak Company, Rochester, N.Y., a corporation of New Jersey
No Drawing. Continuation-in-part of application Ser. No. 493,541, Oct. 6, 1965. This application Sept. 3, 1968, Ser. No. 757,089
Int. Cl. C07d 49/16
U.S. Cl. 260—240.1          6 Claims

ABSTRACT OF THE DISCLOSURE

Light stable compounds, which are useful as colorants and UV inhibitors for various plastics, are defined by the formula

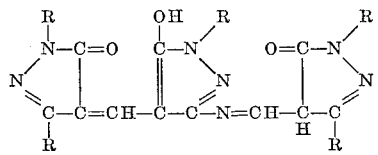

wherein each R, independently, is hydrogen, alkyl, substituted alkyl, phenyl, substituted phenyl, benzamido, substituted benzamido, alkyl sulfamino, carboalkoxy, alkylamido, or alkylamino.

---

This application is a continuation-in-part of Ser. No. 493,541, filed Oct. 6, 1965 now abandoned.

This invention relates to new compositions of matter and, more particularly, to new compositions which are highly effective both as light stable colorants and pigments and ultraviolet stabilizers for plastic materials.

It has now been found, according to this invention, that by reaction of 5-oxo-2-pyrazoline-4-carboxaldehydes with 3-amino-5-oxo-2-pyrazolines novel and valuable compositions may be obtained which possess not only the properties of light-stable colorants or pigments, but also the properties of efficient ultraviolet stabilizers when incorporated in plastic materials such as synthetic resins including polyolefins, cellulose esters and the like, which are susceptible to weathering or deterioration when exposed to ultraviolet light. Furthermore these novel compositions are highly stable under the conditions normally employed in compounding plastics and give a wide variety of shades of yellow to orange which are nonfading on exposure to weathering.

The general structure of the novel compounds of the present invention is as follows:

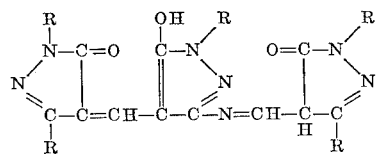

wherein each R, independently, is hydrogen, alkyl, substituted alkyl, phenyl, substituted phenyl, benzamido, substituted benzamido, alkyl sulfamino, alkylamino, or carboalkoxy.

Suitable alkyl radicals are those having 1 to 12 carbon atoms. They may be either straight or branched chain, or of cyclic structure in appropriate instances. Examples of such radicals include methyl, ethyl, propyl, isobutyl, pentyl, octyl, isooctyl, decyl, dodecyl, and cyclohexyl.

The substituted alkyl radicals which may be present are those wherein the alkyl moieties have 1 to 12 carbon atoms as defined above. The substituents on the alkyl radicals include hydroxy radicals; alkoxy radicals having 1 to 6 carbon atoms, such as methoxy, ethoxy, butoxy, hexoxy, cyclohexoxy, and the like;

wherein each $R^1$ is hydrogen or an alkyl radical having 1 to 6 carbon atoms, at least one $R^1$ being an alkyl radical;

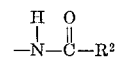

wherein $R^2$ is an alkyl radical having 1 to 6 carbon atoms; or —$COOR^3$, wherein $R^3$ is an alkyl radical having 1 to 6 carbon atoms.

Suitable substituted phenyl and substituted benzamido radicals include those wherein the substituents are any of those described above with respect to the substituted alkyl radicals and, in addition, may be —$SO_2R^4$, wherein $R^4$ is an alkyl radical having 1 to 4 carbon atoms;

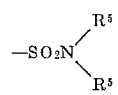

wherein each $R^5$ is hydrogen or an alkyl radical having 1 to 4 carbon atoms;

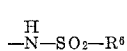

wherein $R^6$ is an alkyl radical having 1 to 4 carbon atoms; trifluoromethyl; cyano; halogen; or nitro.

Examples of suitable alkyl sulfamino radicals and alkylamino radicals include those wherein the alkyl moieties have 1 to 6 carbon atoms.

Examples of suitable carboalkoxy radicals include those wherein the alkoxy moiety has 1 to 6 carbon atoms, such as carbomethoxy, carboethoxy, carbobutoxy, carbohexoxy, and the like.

Some specific examples of the above compounds are described as follows in terms of the substituents appearing in the following formula:

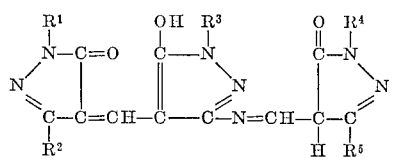

| Ex. | R¹ | R² | R³ | R⁴ | R⁵ |
| --- | --- | --- | --- | --- | --- |
| A | H | H | H | H | H |
| B | H | H | —CH₃ | H | H |
| C | H | —CH₃ | H | H | —CH₃ |
| D | C₆H₅— | —CH₃ | H | C₆H₅— | —CH₃ |
| E | C₆H₅— | —CH₃ | —C(O)—OCH₃ | C₆H₅— | —CH₃ |
| F | H | —CH₃ | —C(O)—OCH₃ | H | —CH₃ |
| G | C₆H₅— | C₆H₅—NH— | C₆H₅— | C₆H₅— | C₆H₅—NH— |
| H | H | C₆H₅—NH— | C₆H₅— | H | C₆H₅—NH— |
| I | H | CH₃C(O)—NH— | C₆H₅— | H | CH₃C(O)—NH— |
| J | 2,4,5-Cl₃C₆H₂— | H | H | 2,4,5-Cl₃C₆H₂— | H |
| K | 3-CH₃-2,5-Cl₂C₆H₂— | H | H | 3-CH₃-2,5-Cl₂C₆H₂— | H |
| L | C₆H₅— | C₆H₁₁— | C₆H₅— | C₆H₅— | C₆H₁₁— |
| M | C₆H₅— | CH₃OCH₂CH₂— | C₆H₅— | C₆H₅— | CH₃OCH₂CH₂— |
| N | H | CH₃(CH₂)₄— | C₆H₅— | H | CH₃(CH₂)₄— |
| O | H | (CH₃)₂N—CH₂CH₂— | C₆H₅— | H | (CH₃)₂N—CH₂CH₂— |
| P | H | (C₂H₅)₂N— | H | H | (C₂H₅)₂N— |
| Q | C₆H₅— | C₆H₅—C(O)—NH— | H | C₆H₅— | C₆H₅—C(O)—NH— |
| R | C₆H₅— | 4-NO₂—C₆H₄— | C₆H₅— | C₆H₅— | 4-NO₂—C₆H₄— |
| S | C₆H₅— | —CH₂CH₂OH | C₆H₅— | C₆H₅— | —CH₂CH₂OH |
| T | 4-NO₂—C₆H₄— | H | C₆H₅— | 4-NO₂—C₆H₄— | H |
| U | H | 4-CF₃—C₆H₄—C(O)—NH— | H | H | 4-CF₃—C₆H₄—C(O)—NH— |
| V | C₆H₅— | CH₃SO₂—NH— | C₆H₅— | C₆H₅— | CH₃SO₂—NH— |

TABLE—Continued

| Ex. | R¹ | R² | R³ | R⁴ | R⁵ |
|---|---|---|---|---|---|
| W | CN–C₆H₄– | CH₃– | –C₆H₅ | CN–C₆H₄– | CH₃– |
| X | H | CH₃–O–C(O)– | 2,4,5-Cl₃–C₆H₂– | H | CH₃–O–C(O)– |
| Y | (CH₃)₂N–C₆H₄– | CH₃– | –C₆H₅ | (CH₃)₂N–C₆H₄– | CH₃– |
| Z | C₆H₅–C₆H₄– | CH₃– | –C₆H₅ | C₆H₅–C₆H₄– | CH₃– |
| Z1 | H | C₂H₅–NH– | CH₃O–C₆H₄– | H | C₂H₅–NH– |
| Z2 | 3-SO₂CH₃–C₆H₄– | H | H | 3-SO₂CH₃–C₆H₄– | H |

The preceding compounds may be prepared by the following general procedure.

The molecular equivalents of 5-oxo-2-pyrazoline-4-carboxaldehyde of the general structure

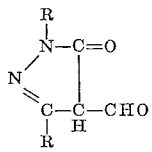

are mixed with one molecular equivalent of a 3-amino-5-oxo-2-pyrazoline of the general structure

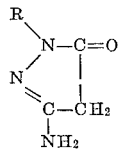

wherein each R is as previously defined. This mixture is dissolved in methyl Cellosolve and heated at 95° to 100° C. for about 2 hours. The reaction mixture is then chilled and filtered. The precipitate is washed with methanol and dried at 65° C. By using various 5-oxo-2-pyrazoline-4-carboxaldehydes and different 3-amino-5-oxo-2-pyrazolines, a large number of compounds as described above can be prepared.

The following specific examples will serve to illustrate the preparation of the above compounds:

The preparation of 4-[5-hydroxy-4-(3-methoxy-5-oxo-1-phenyl - 2 - pyrazolin - 4 - ylidenemethyl)-1-phenyl-2-pyrazolin - 3 - yliminomethyl] - 3 - methyl-1-phenyl-2-pyrazolin-5-one is illustrated by the following equation and procedure:

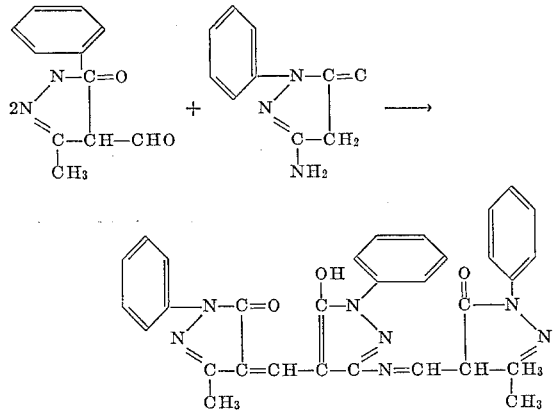

4.04 g. (.02 m.) of 3-methyl-5-oxo-1-phenyl-2-pyrazoline-4-carboxaldehyde, and 1.75 g. (.01 m.) of 3-amino-5-oxo-1-phenyl-2-pyrazoline are mixed dry and added to 10 ml. of methyl Cellosolve. The solution is heated on a steam bath for 2 hours. It is then allowed to cool slowly to room temperature, chilled and filtered. The precipitate is washed with methanol and dried at 65° C. The yield is 87% of bright orange-yellow crystals having a M.P. of 258–260° C.

*Analysis.*—Calcd. (percent): C, 68.49; H, 4.64; O, 8.83; N, 18.04. Found (percent): C, 68.51; H, 4.89; O, 8.86; N, 18.18.

The preparation of 4-[5-hydroxy-4-(5-oxo-1-phenyl-2-pyrazolin - 4 - ylidenemethyl)-1-phenyl - 2 - pyrazolin-3-yliminomethyl]-3-phenyl-2-pyrazolin-5-one is illustrated by the following technique:

3.76 g. (.02 m.) 5-oxo-3-phenyl-2-pyrazoline-4-carboxaldehyde, and 1.75 g. (.01 m.) of 3-amino-5-oxo-1-phenyl-2-pyrazoline are mixed dry and added to 10 ml. of methyl Cellosolve. The reaction is carried out exactly as described for the above compound: Yield—88.5%; M.P. 261–263° C.; percent nitrogen calculated: 19.02. Found: 19.43.

The preparation of 4-[5-hydroxy-4-(3-methyl-5-oxo-2-pyrazolin - 4 - ylidenemethyl)-1-phenyl - 2 - pyrazolin-3-yliminomethyl]-3-phenyl-2 - pyrazolin-5-one is illustrated by the following procedure:

2.52 g. (.02 m.) 3-methyl-5-oxo-2-pyrazoline-4-carboxaldehyde, and 1.75 g. (.01 m.) of 3-amino-5-oxo-1-phenyl-2-pyrazoline are mixed dry and added to 10 ml. of methyl Cellosolve, with the reaction being conducted as above. Yield—97%; M.P. 270–271° C.

*Analysis.*—Calculated (percent): C, 58.30; H, 4.38; N, 25.05; O, 12.26. Found (percent): C, 58.16; H, 4.41; N, 24.82; O, 12.90.

The preparation of 4-[5-hydroxy-4-(3-isobutyl-5-oxo-2-pyrazolin - 4 - ylidenemethyl)-1-phenyl - 2 - pyrazolin-3-yliminomethyl]-3-isobutyl-2-pyrazolin-5-one is illustrated as follows: 3.36 g. (.02 m.) 3-isobutyl-5-oxo-2-pyrazoline-4-carboxaldehyde, and 1.75 g. (.01 m.) 3-amino-5-oxo-1-phenyl-2-pyrazoline are mixed dry and added to 10 ml. of methyl Cellosolve. Reaction is carried out as described above. Yield—80%; M.P. 223–224° C.

*Analysis.*—Calculated (percent): C, 63.14; H, 6.15; N, 20.62. Found (percent): C, 63.30; H, 6.09; N, 20.90.

The following procedure illustrates the preparation of 4 - [5 - hydroxy - 4-(5-oxo-1,3-diphenyl-2-pyrazolin-4-ylidenemethyl) - 1 - phenyl-2-pyrazoline-3-yliminomethyl]-1,3-diphenyl-2-pyrazolin-5-one:

5.28 g. (.02 m.) 5-oxo-1,3-diphenyl-2-pyrazoline-4-carboxaldehyde, and 1.75 g. (.01 m.) 3-amino-5-oxo-1- phenyl-2-pyrazoline are mixed dry and added to 10 ml. of methyl Cellosolve. Reaction is carried out as described above. Yield—81%; M.P. 252–255° C.

*Analysis.*—Calculated (percent): C, 73.75; H, 4.38; N, 14.69. Found (percent): C, 73.66; H, 4.40; N, 14.41.

The reactants in the above examples may be readily obtained as will be understood by those skilled in the art. For example, the 5-oxo-2-pyrazoline-4-carboxaldehydes are easily prepared by treating a solution of the desired pyrazolone in dimethylformamide with phosphorous oxychloride. The product is obtained on drowning in water.

The reactant, 3 - methyl-5-oxo-1-phenyl-2-pyrazoline-4-carboxaldehyde, may be prepared as follows:

A solution of 85 g. of 3-methyl-1-phenyl-5-pyrazolone in 100 cc. of dimethyl formamide is cooled to 0° C. Then 82 g. of phosphorous oxychloride is added dropwise below 20° C. When the addition is complete, the reaction mixture is heated without stirring on the steam bath for 1.5 hours. The mixture is drowned on an ice-water mixture and allowed to stand overnight at room temperature. The solid which precipitates is filtered off, washed with water, and dried. The yield is 91.75 g. (91%) having a M.P. of 174–175° C.

The preparation of 3-amino-5-oxo-1-phenyl-2-pyrazoline which follows is a specific example of the production of the 3-amino-5-oxo-2-pyrazoline reactants.

To a solution of 36.8 g. of metallic sodium in 640 ml. of absolute ethanol is added 90.4 g. of ethyl cyanoacetate and 86.4 g. of phenylhydrazine. The solution is refluxed for 16 hours. The alcohol is removed under vacuum and the residue dissolved in 800 ml. of hot water. The solution is cooled to room temperature and extracted with 400 ml. of ethyl ether. The aqueous portion is acidified with 80 ml. of acetic acid and filtered. The precipitate is washed with water and recrystallized from alcohol. The product melts at 208–210° C. with decomposition.

The above compounds are useful as colorants and ultraviolet stabilizers in various plastic materials as shown by the following evaluations. In these evaluations the compounds are incorporated into the plastic materials and then exposed to natural and/or artificial weathering following by measurements of the physical properties to determine the extent of deterioration. The color stability is measured by visual comparisons of the exposed materials with an unexposed control. The compounds used are listed in Table 1.

EXAMPLE 1

To 0.4 g. of commercially available polypropylene powder of inherent viscosity 1.4 there is added 0.02 g. of the compound to be evaluated. The mixture is dissolved in 10 ml. of tetralin by heating with agitation at 145° C. for 30 minutes. The resultant dope is then cast onto a ferrotype plate maintained at 143° and the tetralin evaporated to leave a 3 mil thick film of the polypropylene composition. The ferrotype plate and film is quenched in cold water and the film stripped from the plate. Test specimens 2.5 x 0.5 in. are cut from the film and exposed to artificial weathering in an Atlas Twin-Arc Weather-Ometer, modified with ten 20 W. Westinghouse Sunlamps [Anal. Chem. 25, 460 (1953)]. The exposure time required to render the film brittle when creased with the exposed side of the film on the outside of the bend is measured. A stabilization rating is calculated according to the following relationship.

$$\text{Stabilization rating} = \frac{\text{exposure time required to embrittle stabilized film}}{\text{exposure time required to embrittle unstabilized film}}$$

Evaluations of the light fastness of the colorant are made by visually comparing the exposed film with an unexposed specimen of the film. The results of the weathering tests are summarized in Table 1.

TABLE 1

| | | M.P., °C. | Color change on exposure | Stability rating |
|---|---|---|---|---|
| (A) | 4-[5-hydroxy-4-(3-methyl-5-oxo-1-phenyl-2-pyrazolin-4-ylidenemethyl)-1-phenyl-2-pyrazolin-3-yliminomethyl]-3-methyl-1-phenyl-2-pyrazolin-5-one. | 258–260 | None | 50 |
| (B) | 4-[5-hydroxy-4-(5-oxo-1-phenyl-2-pyrazolin-4-ylidenemethyl)-1-phenyl-2-pyrazolin-3-yliminomethyl]-3-phenyl-2-pyrazolin-5-one. | 261–263 | None | 9 |
| (C) | 4-[5-hydroxy-4-(3-methyl-5-oxo-2-pyrazolin-4-ylidenemethyl)-1-phenyl-2-pyrazolin-3-yliminomethyl]-3-methyl-2-pyrazolin-5-one. | 270–271 | None | 3 |
| (D) | 4-[5-hydroxy-4-(3-isobutyl-5-oxo-2-pyrazolin-4-ylidenemethyl)-1-phenyl-2-pyrazolin-3-yliminomethyl]-3-isobutyl-2-pyrazolin-5-one. | 223–224 | None | 12 |
| (E) | 4-[5-hydroxy-4-(5-oxo-1,3-diphenyl-2-pyrazolin-4-ylidenemethyl)-1-phenyl-2-pyrazolin-3-yliminomethyl]-1,3-diphenyl-2-pyrazolin-5-one. | 252–255 | None | 18 |

EXAMPLE 2

The compounds listed in Table 1 are incorporated in commercially available polypropylene of inherent viscosity 1.4 at a 1% concentration level by compounding in a C. W. Brabender Plastograph. The compounded slab is granulated and injection molded into tensile specimens $\frac{1}{16}''$ thick and 2.5″ long. The tensile specimens are bent into a U and inserted upside down in a channel $\frac{5}{8}''$ wide and $\frac{1}{2}''$ deep. The channel containing the stressed tensile specimens is then exposed to artificial weathering in the modified Atlas Weather-Ometer described in Example 1. The stress-crack life is measured as the exposure time required to develop cracks visible under 3× magnification in the stressed specimens. The light fastness of the compositions is measured by visually comparing the exposed specimen with an unexposed specimen of the same composition. The results of the weathering test are summarized in Table 2.

TABLE 2

| Additive | Color change on exposure | Stress crack life, hrs. |
|---|---|---|
| Compound A, Table 1 | None | 283 |
| Compound B, Table 1 | None | 212 |
| Compound C, Table 1 | None | 236 |
| Compound D, Table 1 | None | 181 |
| Compound E, Table 1 | None | 181 |

EXAMPLE 3

The materials listed in Table 1 are incorporated in cellulose acetate-butyrate (13% acetyl, 38% butyryl) by hot-roll compounding the following ingredients: 100 parts of cellulose acetate butyrate, 12 parts of dibutyl sebacate and 0.5 part of the stabilizer-colorant. The temperature of the front roll is 270° F. and the rear roll 230° F. 50 mil thick plates are compression molded at 320° F. from the roll slab. Test specimens 0.5 x 2.5 in. are cut from these plates and exposed to artificial weathering in an Atlas Weather-Ometer, type XWR. The effects of weathering are determined quantitatively by measurement of flexural strength in accordance with the Tour-Marshal procedure (ASTM–D747–43). The light fastness is measured by visual comparison of the exposed specimen with an unexposed specimen. Cellulose acetate butyrate compositions containing 1 part of lead chromate, a commonly used yellow pigment for cellulosics, and compositions containing Du Pont Naphthol Green B, a light-fast green colorant, are also tested for comparison. The results of the weathering tests are summarized in Table 3.

TABLE 3

| Additive | Reduction to 50% initial flexural strength, hrs. | Color change |
|---|---|---|
| Compound A, Table 1 | 9,000 | None. |
| Compound B, Table 1 | 14,000 | None. |
| Compound C, Table 1 | 14,000 | None. |
| Compound D, Table 1 | 12,000 | None. |
| Compound E, Table 1 | 14,000 | None. |
| Lead chromate | 1,750 | Darkens. |
| Du Pont Naphthol Green B | 1,750 | None. |
| None | 250 | |

The general range of concentration of the compounds of this invention in the plastic materials is from 0.1 to 10% by weight of the polymeric material, whether the primary objective is coloration or stabilization, although it is preferred, when coloration is the objective, to employ about 0.2 to 4% and when stabilization is the objective, to employ about 0.5 to 5% by weight.

In general, it has been found that a particle size of less than 3 microns should be used, for both coloration and stabilization, with a preferred range of about one-fourth to one micron.

The compounds may be incorporated into the polymer by various means, for example, by milling the stabilizing colorant for a time, then introducing the polymeric substrate and milling further. If a textile fiber is to be the end product, the intimate mix may then be spun from the melt or incorporated into a solvent for the vehicle and spun from a dope, as dictated by the character of the material. High concentrations of the stabilizing colorant may be milled into the polymeric material, which can serve as a concentrate or stock, which may be diluted later with pure polymer to obtain the strength desired.

Thus having described the invention in detail it will be understood by those skilled in the art that certain variations and modifications may be made without departing from the spirit and scope of the invention as defined herein and in the appended claims.

We claim:
1. A compound defined by the formula

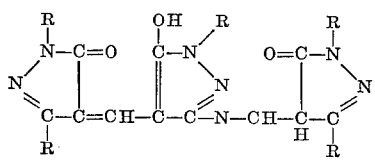

wherein each R, independently, is
(a) hydrogen,
(b) an alkyl radical having 1 to 12 carbon atoms,
(c) a substituted alkyl radical wherein the alkyl moiety has 1 to 12 carbon atoms and the substituents are hydroxy radicals; alkoxy radicals having 1 to 6 carbon atoms;

wherein each $R^1$ is hydrogen or an alkyl radical having 1 to 6 carbon atoms, at least one $R^1$ being an alkyl radical;

wherein $R^2$ is an alkyl radical having 1 to 6 carbon atoms; or

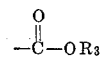

wherein $R^3$ is an alkyl radical having 1 to 6 carbon atoms,
(d) phenyl or benzamido,
(e) phenyl or benzamido substituted with hydroxy radicals; alkoxy radicals having 1 to 6 carbon atoms;

wherein each $R^1$ is hydrogen or an alkyl radical having 1 to 6 carbon atoms, at least one $R^1$ being an alkyl radical;

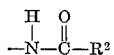

wherein $R^2$ is an alkyl radical having 1 to 6 carbon atoms;

wherein $R^3$ is an alkyl radical having 1 to 6 carbon atoms; —$SO_2R^4$, wherein $R^4$ is an alkyl radical having 1 to 4 carbon atoms;

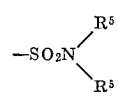

wherein each $R^5$ is hydrogen or an alkyl radical having 1 to 4 carbon atoms;

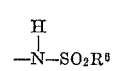

wherein $R^6$ is an alkyl radical having 1 to 4 carbon atoms; trifluoromethyl; cyano; halogen; or nitro,
(f) alkyl sulfamino radicals wherein the alkyl moiety has 1 to 6 carbon atoms,
(g) alkylamino radicals wherein the alkyl moiety has 1 to 6 carbon atoms,
(h) or carboalkoxy radicals wherein the alkoxy moiety has 1 to 6 carbon atoms.

2. A compound according to claim 1 which is 4-[5-hydroxy-4-(3 - methyl-5-oxo-1-phenyl-2-pyrazolin-4-ylidenemethyl)-1-phenyl-2-pyrazolin-3 - yliminomethyl]-3-methyl-1-phenyl-2-pyrazolin-5-one.

3. A compound according to claim 1 which is 4-[5-hydroxy-4-(5-oxo-1-phenyl-2-pyrazolin - 4 - ylidenemethyl)-1-phenyl-2-pyrazolin-3-yliminomethyl] - 3 - phenyl-2-pyrazolin-5-one.

4. A compound according to claim 1 which is 4-[5-hydroxy-4-(3 - methyl-5-oxo-2-pyrazolin-4-ylidenemethyl)-1-phenyl-2-pyrazolin-3-yliminomethyl] - 3 - methyl-2-pyrazolin-5-one.

5. A compound according to claim 1 which is 4-[5-hydroxy-4-(3-isobutyl - 5 - oxo-2-pyrazolin-4-ylidenemethyl)-1-phenyl-2-pyrazolin-3-yliminomethyl] - 3 - isobutyl-2-pyrazolin-5-one.

6. A compound according to claim 1 which is 4-[5-hydroxy-4-(5 - oxo-1,3-diphenyl-2-pyrazolin-4-ylidenemethyl)-1-phenyl-2-pyrazolin-3-yliminomethyl]-1,3 - diphenyl-2-pyrazolin-5-one.

References Cited

UNITED STATES PATENTS 3,364,211    1/1968   Stanley _____ 260—240.2

FOREIGN PATENTS 912,796   12/1962   England.

JOHN D. RANDOLPH, Primary Examiner

U.S. Cl. X.R.

106—176; 252—401; 260—17, 45.8, 45.9, 45.95, 310